US008489212B2

(12) United States Patent
Lee

(10) Patent No.: US 8,489,212 B2
(45) Date of Patent: Jul. 16, 2013

(54) AUDIO DATA TRANSMISSION AND RECEPTION METHODS AND ELECTRONIC APPARATUS USING THE SAME

(75) Inventor: Seung-su Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1326 days.

(21) Appl. No.: 12/022,424

(22) Filed: Jan. 30, 2008

(65) Prior Publication Data

US 2009/0024236 A1 Jan. 22, 2009

(30) Foreign Application Priority Data

Jul. 16, 2007 (KR) ........................ 10-2007-0071362

(51) Int. Cl.
*G06F 17/00* (2006.01)
*G08C 19/12* (2006.01)

(52) U.S. Cl.
USPC .............................. 700/94; 341/180; 327/396

(58) Field of Classification Search
USPC .................. 700/94; 381/2, 19; 375/242–254, 375/307; 370/478; 341/180
See application file for complete search history.

(56) References Cited

U.S. PATENT DOCUMENTS

| | | | | | |
|---|---|---|---|---|---|
| 4,562,581 | A * | 12/1985 | Tanaka et al. | ................. | 375/242 |
| 4,755,817 | A * | 7/1988 | Vandenbulcke et al. | ...... | 370/468 |
| 6,327,272 | B1 * | 12/2001 | Van Steenbrugge | .......... | 370/498 |
| 7,062,336 | B1 * | 6/2006 | Yang et al. | ....................... | 700/94 |
| 7,385,430 | B2 * | 6/2008 | Lee | ............................... | 327/291 |
| 2005/0036508 | A1 * | 2/2005 | Tran et al. | ..................... | 370/465 |
| 2008/0114479 | A1 * | 5/2008 | Wu et al. | ......................... | 700/94 |

OTHER PUBLICATIONS

IEEE, “IEEE 100 The Authoritative Dictionary of IEEE Standard Terms”, 2000, IEEE, Seventh Edition, pp. i-v and 177.*

* cited by examiner

*Primary Examiner* — Jesse Elbin
(74) *Attorney, Agent, or Firm* — Sughrue Mion, PLLC

(57) ABSTRACT

Audio data transmission and reception methods and an electronic apparatus using the same are provided. The audio data transmission and reception methods send audio data by one bit at the rising edge and at the falling edge of a bit clock, and send audio data over a null interval carrying no data. Hence, 5.1 channel audio data can be transmitted and received using an I2S transmission scheme.

27 Claims, 5 Drawing Sheets

AUDIO DATA TRANSMISSION AND RECEPTION METHODS AND ELECTRONIC APPARATUS USING THE SAME

CROSS-REFERENCE TO RELATED APPLICATIONS

This application claims priority from Korean Patent Application No. 10-2007-0071362, filed on Jul. 16, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to audio data transmission and reception, and more particularly, to digital audio data transmission and reception using an I2S transmission scheme between ICs.

2. Description of the Related Art

In general, audio data transmission schemes include Inter-IC Sound (I2S), Sony/Philips Digital Interface (S/PDIF), and Audio Engineering Society/European Broadcasting Union (AES/EBU). The I2S is the most widely used to transmit 2-channel Pulse Code Modulation (PCM) audio data between an Analog Digital Converter (ADC), a Digital Analog Converter (DAC), and Integrated Circuits (ICs) of a Digital Signal Processor (DSP).

FIGS. 1A and 1B show audio data transmission and reception methods of the related art.

The audio data transmission and reception methods of FIGS. 1A and 1B relate to the I2S transmission scheme. The I2S transmission scheme transfers audio data through a channel select clock (hereafter, referred to as an LRCLK) line, a bit clock (hereafter, referred to as a BCLK) line, an audio sample data (hereafter, referred to as an SDATA) line, and a master clock (or a system clock) line.

In FIG. 1A, when the LRCLK is low, audio sample data of the left channel is transmitted along the SDATA line in serial. When the LRCLK is high, audio sample data of the right channel is transmitted along the SDATA line in serial. A reception side latches and reads the SDATA at the rising edge of the BCLK.

The audio sample data up to 32 bits (n=32) can be transmitted at one time when the LRCLK is low or high. 16-bit, 20-bit, 22-bit, or 24-bit audio sample data is typically transmitted. Considering audio quality, 16 bits are most frequently used. When transmitting up to 32-bit audio data, the transmission side does not send data over eight 6-bit null intervals excluding the actual audio sample data. Thus, the reception side does not process the null interval at all.

For instance, when the audio sampling frequency (Fs) is 48 kHz, the BCLK is 3.072 MHz because the BCLK is at most 64 times the LRCLK. In FIG. 1B, one period $t_{BCLK}$ of the BCLK is about 326 ns (1/3.072 MHz). A minimum hold time $t_{DH}$ required to normally latch the SDATA at the rising edge of the BCLK is typically about 10 ns. Since the minimum hold time $t_{DH}$ is much greater than 10 ns in FIG. 1B, the reception side can normally latch the SDATA.

As discussed above, as the SDATA is synchronized with the low level and the high level of the LRCLK, the I2S transmission scheme serially transmits the audio sample data of the left and right channels in sequence. Hence, the I2S transmission scheme is used mainly to transmit the 2-channel PCM audio data. To adopt the I2S transmission scheme to transmit 5.1 channel audio data, three I2S input/output (I/O) interfaces are required.

When the I2S transmission scheme is used to transmit audio data of a multi-channel such as 5.1 channel, the IC pin count increases and the increased circuit design raises the cost.

SUMMARY OF THE INVENTION

Exemplary embodiments of the present invention overcome the above disadvantages and other disadvantages not described above. Also, the present invention is not required to overcome the disadvantages described above, and exemplary embodiments of the present invention may not overcome any of the problems described above.

The present invention provides methods for transmitting and receiving audio sample data at falling edges of a bit block and over a null interval to use the I2S transmission scheme to send 5.1 channel audio data without additional I/O interfaces, and an electronic apparatus using the same.

The present invention also provides methods for transmitting and receiving the same audio sample data at the falling edge of the bit clock with the rising edge of the bit clock to ensure the compatibility with a conventional audio data reception IC using an I2S transmission scheme, and an electronic apparatus using the same.

According to an aspect of the present invention, an audio data transmission method comprises transmitting a first clock signal; transmitting a second clock signal having a frequency that is several times higher than a frequency of the first clock signal while transmitting the first clock signal; and transmitting audio data by several bits over one period of the second clock signal.

The audio data transmitting operation may transmit the audio data by two bits over one period of the second clock signal. The audio data transmitting operation may transmit the audio data of multiple channels over a half period of the first clock signal.

The audio data transmitting operation may comprise, when the first clock signal is low, transmitting audio data of a first channel at a rising edge of the second clock signal by one bit and transmitting audio data of a second channel at a falling edge of the second clock signal by one bit; when the first clock signal is high, transmitting audio data of a third channel at a rising edge of the second clock signal by one bit and transmitting audio data of a fourth channel at a falling edge of the second clock signal by one bit; and after transmitting the audio data of the first channel and the third channel, transmitting audio data of a fifth channel at a rising edge of the second clock signal by one bit and transmitting audio data of a sixth channel at a falling edge of the second clock signal by one bit.

The audio data transmitting operation may transmit part of audio data of a certain channel when the first clock signal is low and transmit the remaining audio data of the certain channel when the first clock signal is high.

The audio data may be 5.1 channel audio data.

The frequency of the second clock signal may be at most 64 times the frequency of the first clock signal.

According to an aspect of the present invention, an audio data reception method comprises receiving a first clock signal; receiving a second clock signal having a frequency several times higher than a frequency of the first clock signal while receiving the first clock signal; and receiving audio data by several bits over one period of the second clock signal.

The audio data receiving operation may receive the audio data by two bits over one period of the second clock signal. The audio data receiving operation may receive the audio data of multiple channels over a half period of the first clock signal.

The audio data receiving operation may comprise, when the first clock signal is low, receiving audio data of a first channel at a rising edge of the second clock signal by one bit and receiving audio data of a second channel at a falling edge of the second clock signal by one bit; when the first clock signal is high, receiving audio data of a third channel at a rising edge of the second clock signal by one bit and receiving audio data of a fourth channel at a falling edge of the second clock signal by one bit; and after receiving the audio data of the first channel and the third channel, receiving audio data of a fifth channel at a rising edge of the second clock signal by one bit and receiving audio data of a sixth channel at a falling edge of the second clock signal by one bit.

The audio data receiving operation may receive part of audio data of a certain channel when the first clock signal is low and receive the remaining audio data of the certain channel when the first clock signal is high.

The audio data may be 5.1 channel audio data.

The frequency of the second clock signal may be at most 64 times the frequency of the first clock signal.

According to another aspect of the present invention, an electronic device comprises a transmitter which transmits audio data by several bits over one period of a second clock signal having a frequency several times higher than a frequency of a first clock signal; and a receiver which is synchronized with the transmitter and receives the audio data from the transmitter.

The transmitter may send the audio data by two bits over one period of the second clock signal. The transmitter may send the audio data of multiple channels over a half period of the first clock signal.

When the first clock signal is low, the transmitter may send audio data of a first channel at a rising edge of the second clock signal by one bit and send audio data of a second channel at a falling edge of the second clock signal by one bit. When the first clock signal is high, the transmitter may send audio data of a third channel at a rising edge of the second clock signal by one bit and send audio data of a fourth channel at a falling edge of the second clock signal by one bit.

The transmitter may send part of audio data of a certain channel when the first clock signal is low and send the remaining audio data of the certain channel when the first clock signal is high.

The audio data may be 5.1 channel audio data.

The frequency of the second clock signal may be at most 64 times the frequency of the first clock signal.

The electronic apparatus may be a broadcasting receiver.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1A:
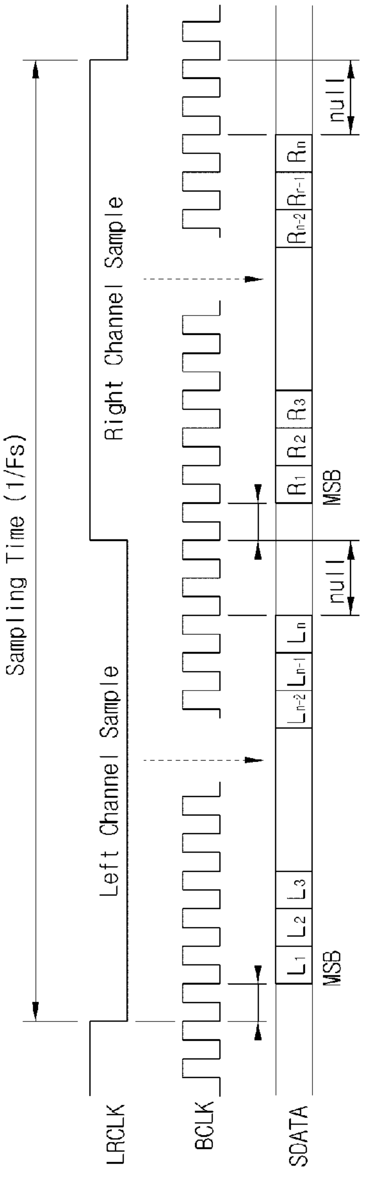
FIG. 1A (RELATED ART)
FIGS. 1A and 1B depict audio data transmission and reception methods of the related art.
Figure 1B:
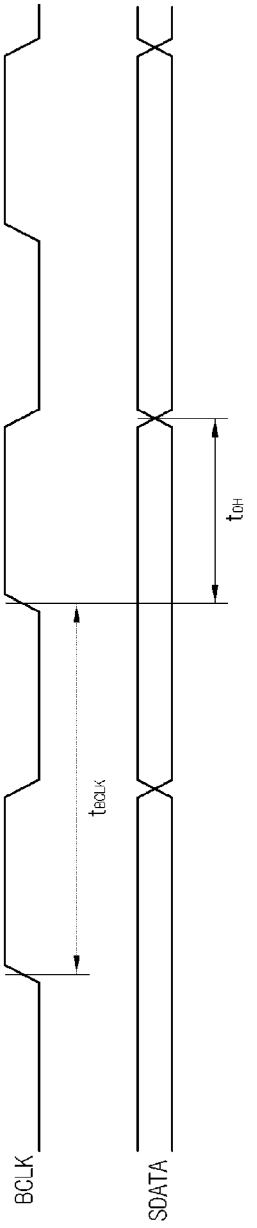
FIG. 1B (RELATED ART)

Certain exemplary embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments of the present invention can be carried out without those specifically defined matters. Also, well-known functions or constructions are not described in detail since they may obscure the invention with unnecessary detail.

Figure 2A:
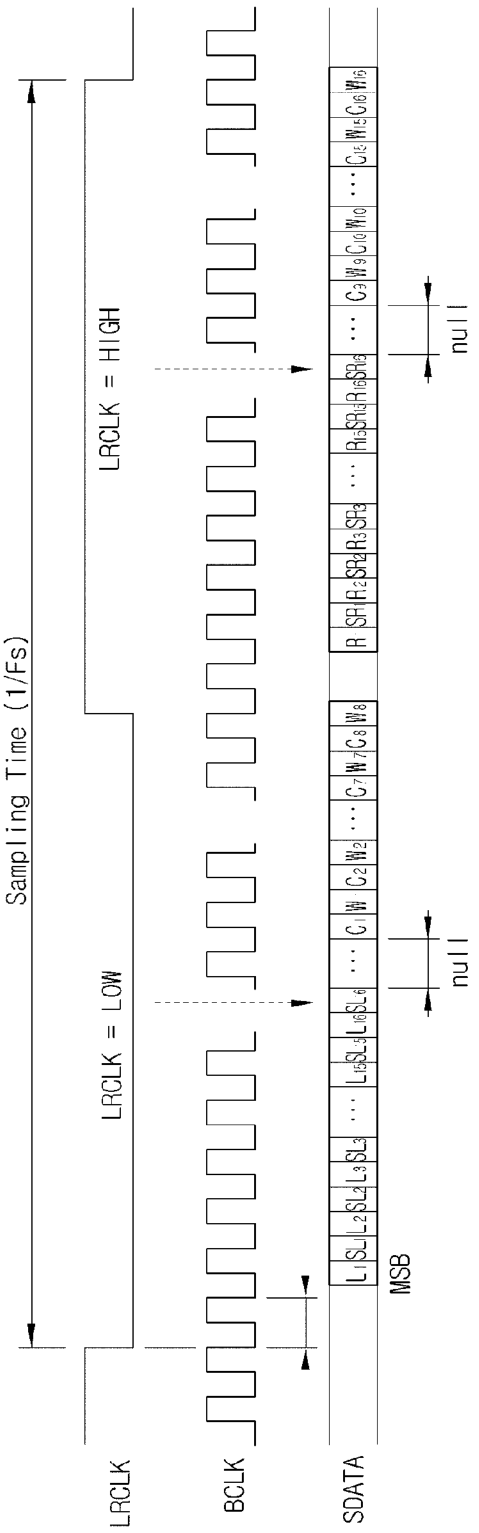
FIGS. 2A and 2B depict audio data transmission and reception methods according to an exemplary embodiment of the present invention.
Figure 2B:
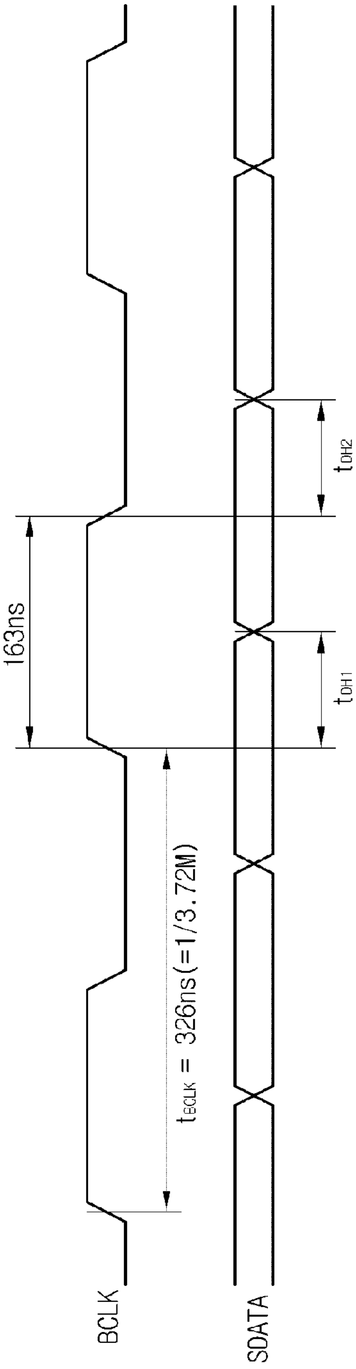

FIGS. 2A and 2B depict audio data transmission and reception methods according to an exemplary embodiment of the present invention.

FIGS. 2A and 2B show as an example methods for transmitting and receiving 5.1 channel 16-bit audio data. Referring first to FIG. 2A, a bit clock (hereafter, referred to as BCLK) is generated to have a frequency which is 64 times the frequency of a channel select clock (hereafter, referred to as LRCLK). Two-bits of audio data are transmitted within one period of the BCLK. Hence, it is possible to send 64-bit audio data (hereafter, referred to as SDATA) during a half period of the LRCLK because one bit is transmitted at the rising edge and the falling edge of the BCLK.

In FIG. 2B, a time $t_{BCLK}$ of one period of the BCLK is about 326 ns (1/3.072 MHz) and a half period of the BCLK is 163 ns. Since hold times $t_{DH1}$ and $t_{DH2}$ required to latch the SDATA at the rising edge and the falling edge of the BCLK are much greater than a minimum hold time 10 ns, there is no problem at all for a reception side to latch the SDATA.

The 5.1 channel audio data comprises left (L) channel audio data, right (R) channel audio data, surround left (SL) channel audio data, surround right (SR) channel audio data, center (C) channel audio data, and sub-woofer (W) channel audio data.

When the LRCLK is low in FIG. 2A, a number of the rising edges of the BCLK each carry one bit of L audio data ($L_1$, $L_2$, $L_3$, . . . , $L_{15}$, $L_{16}$) and a number of the falling edges of the BCLK each carry one bit of SL audio data ($SL_1$, $SL_2$, $SL_3$, . . . , $SL_{15}$, $SL_{16}$). After transmission of the L audio data and the SL audio data, a number of the rising edges of the BCLK each carry one bit of C audio data ($C_1$, $C_2$, . . . , $C_8$) and a number of the falling edges of the BCLK each carry one bit of W audio data ($W_1$, $W_2$, . . . , $W_8$).

Since the audio data of each channel consists of 16 bits, a null interval carrying no data is generated after the transmissions of the L audio data and the SL audio data.

When the LRCLK is high, a number of the rising edges of the BCLK each carry one bit of R audio data ($R_1$, $R_2$, $R_3$, . . . , $R_{15}$, $R_{16}$) and a number of the falling edges of the BCLK each carry one bit of SR audio data ($SR_1$, $SR_2$, $SR_3$, . . . , $SR_{15}$, $SR_{16}$). After transmission of the R audio data and the SR audio data, a number of the rising edges of the BCLK each carry one bit of C audio data ($C_9$, $C_{10}$, . . . , $C_{16}$)

and a number of the falling edges of the BCLK each carry one bit of W audio data ($W_9$, $W_{10}$, . . . , $W_{16}$).

Since the audio data of each channel consists of 16 bits, a null interval carrying no data is generated after the transmissions of the R audio data and the SR audio data as well.

The 5.1 channel audio data can be transmitted in a different order from that shown in FIGS. 2A and 2B. Preferably, the audio data is transmitted regardless of the order of L, R, SL, SR, C, and W.

Even when the audio data consists of 20 bits, the 5.1 channel audio data can be transmitted as described above. Notably, when the audio data consists of 22 bits and 24 bits, it is possible to transmit the audio data of only four channels.

Figure 3:
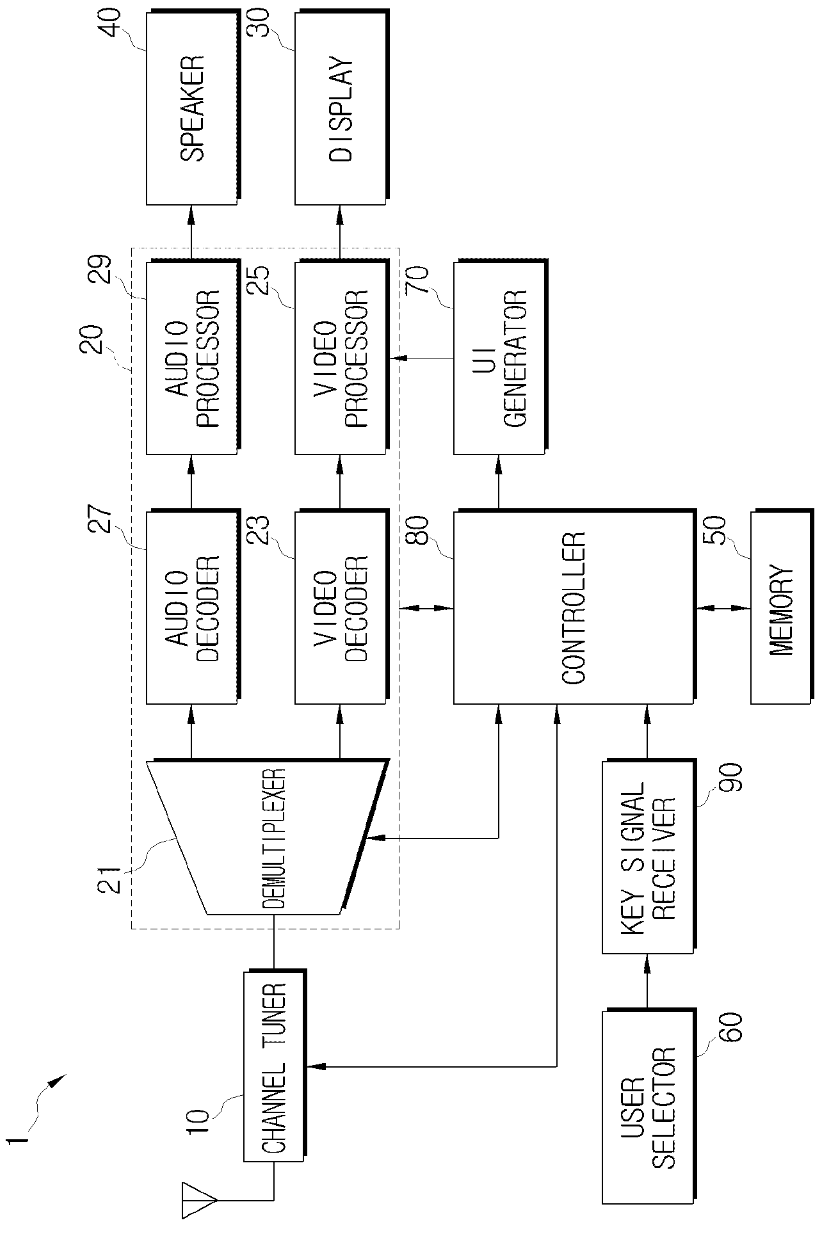
FIG. 3 is a simplified block diagram of a broadcasting receiver using the audio data transmission and reception methods according to an exemplary embodiment of the present invention.

FIG. 3 is a simplified block diagram of a broadcasting receiver using the audio data transmission and reception method according to an exemplary embodiment of the present invention.

The broadcasting receiver 1 of FIG. 3 comprises a channel tuner 10, a signal processor 20, a display 30, a speaker 40, a memory 50, a user selector 60, a user interface (UI) generator 70, a controller 80, and a key signal receiver 90.

The channel tuner 10 can be implemented using a tuner which tunes a broadcast signal received over an antenna, and a demodulator which outputs a transport stream (TS) by demodulating and error-correcting the tuned broadcast signal. The channel tuner 10 tunes a broadcast signal having a frequency band corresponding to a control signal of the controller 80, to be explained.

The signal processor 20 comprises a demultiplexer 21, a video decoder 23, a video processor 25, an audio decoder 27, and an audio processor 29.

The demultiplexer 21 splits the broadcast signal demodulated at the channel tuner 10 to video data, audio data, and additional data defined according to Program and Service Information Protocol (PSIP), and outputs them as bit streams.

The video decoder 23 decodes the video data split at the demultiplexer 21. The video processor 25 processes the decoded video data to have a vertical frequency, a resolution, and an aspect ratio in conformity to an output specification of the display 30. The video processor 25 comprises a scaler.

The display 30 displays the video data processed at the video processor 25. The display 30 can employ various display modules such as digital lighting processing (DLP), liquid crystal display (LCD), and plasma display panel (PDP).

The audio decoder 27 decodes the audio data split at the demultiplexer 21 and sends the decoded audio data to the audio processor 29 according to the audio data transmission method of the present invention. The audio data split from the broadcast signal may be Dolby AC3 5.1 channel digital data, and audio data of each channel is sent to the audio processor 29 according to the transmission method of FIGS. 2A and 2B.

The audio processor 29 receives the audio data from the audio decoder 27 and processes the received audio data according to the audio data reception method of the present invention. After receiving the 5.1 channel audio data from the audio decoder 27, the audio processor 29 outputs 2-channel stereo audio data Lt and Rt by performing an audio enhancement algorithm.

The speaker 40 outputs the 2-channel stereo audio data Lt and Rt fed from the audio processor 29 as left and right sounds.

The memory 50 contains programs required to execute the operations of the broadcasting receiver 1, and setup status of the broadcast receiver 1 which is input by a user.

The user selector 60 comprises keys and a remote controller for receiving a user's command, to output a key signal corresponding to the user command.

The key signal receiver 90 receives the key signal from the user selector 60 and forwards it to the controller 80.

The UI generator 70 generates an on-screen display (OSD) to display a message indicative of the status of the broadcasting receiver 1 on a screen. The OSD generated by the UI generator 70 is processed at the video processor 25 and displayed by the display 30.

When a user command is input through the user selector 60, the controller 80 controls the components to perform the corresponding function. The controller 80 can be implemented using a microprocessor or a central processing unit (CPU).

Figure 4:
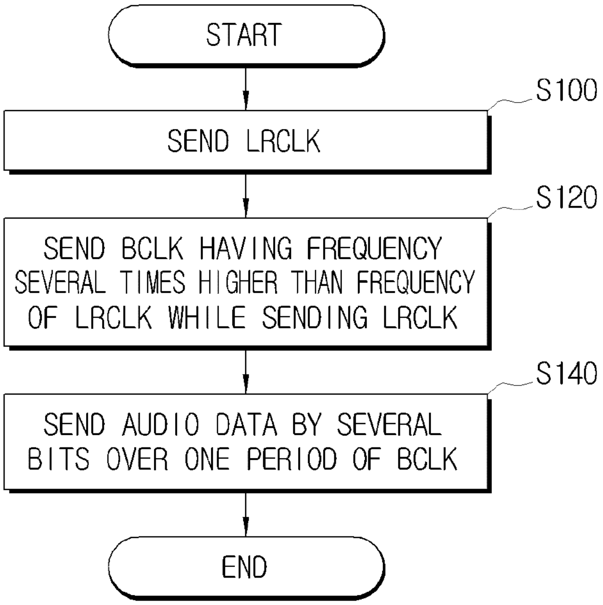
FIG. 4 is a flowchart of an audio data transmission method according to an exemplary embodiment of the present invention.

FIG. 4 is a flowchart of the audio data transmission method according to an exemplary embodiment of the present invention.

In FIG. 4, the LRCLK is transmitted (S100). During the transmission of the LRCLK, the BCLK having a frequency which is several times higher than the frequency of the LRCLK (S120) is sent. The frequency of the BCLK may be 64 times the frequency of the LRCLK.

Several bits of the audio data is transmitted by several bits within one period of the BCLK (S140). Specifically, one bit of the audio data is transmitted at each of a number of the rising edges of the BCLK and at each of a number of the falling edges of the BCLK. Thus, the audio data of the multiple channels can be transmitted within a half period of the LRCLK.

Figure 5:
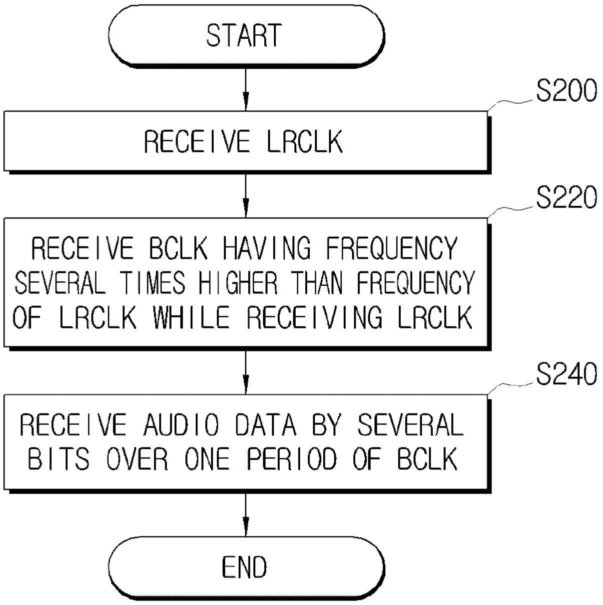
FIG. 5 is a flowchart of an audio data reception method according to an exemplary embodiment of the present invention.

FIG. 5 is a flowchart of the audio data reception method according to an exemplary embodiment of the present invention.

In FIG. 5, the LRCLK is received (S200). During the reception of the LRCLK, the BCLK having a frequency which is several times higher than the frequency to the LRCLK is received (S220). The frequency of the BLCK may be 64 times the frequency of the LRCLK.

Several bits of the audio data is received over one period of the BCLK (S240). Specifically, one bit of the audio data is latched at each rising edge and each falling edge of the BCLK. Hence, the audio data of the multiple channels can be received over a half period of the LRCLK.

As indicated above in FIGS. 4 and 5, the 5.1 channel audio data can be transmitted and received using the I2S transmission scheme.

Figure 6:
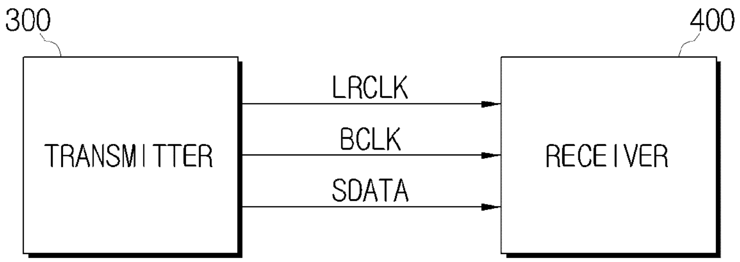
FIG. 6 is a simplified block diagram of an electronic apparatus using the audio data transmission and reception methods according to another exemplary embodiment of the present invention.

FIG. 6 is a simplified block diagram of an electronic apparatus using the audio data transmission and reception methods according to another exemplary embodiment of the present invention.

The electronic apparatus of FIG. 6 comprises a transmitter 300 and a receiver 400. The transmitter 300 and the receiver 400 transmit and receive audio data along a first signal line LRCLK, a second signal line BCLK, and a data line SDATA. That is, the transmitter 300 and the receiver 400 can transmit and receive 5.1 channel audio data using the I2S transmission scheme.

When the first clock signal transmitted in the first signal line LRCLK is high, the transmitter 300 sends one bit of L audio data at each of a number of the rising edges of the second clock signal sent through the second signal line BCLK ($L_1$, $L_2$, $L_3$, . . . , $L_{15}$, $L_{16}$) and sends SL audio data at each of a number of the falling edges of the second clock signal ($SL_1$, $SL_2$, $SL_3$, . . . , $SL_{15}$, $SL_{16}$). After transmission of the L audio data and the SL audio data, the transmitter 300 sends one bit of C audio data at each of a number of the rising edges of the second clock signal ($C_1$, $C_2$, . . . , $C_8$) and sends one bit of W audio data at each of a number of the falling edges of the second clock signal ($W_1$, $W_2$, . . . , $W_8$).

Since the audio data consists of 16 bits per channel, a null interval carrying no data is generated after the transmissions of the L and SL audio data.

When the first clock signal is low, the transmitter 300 sends one bit of R audio data at each of a number of the rising edges of the second clock signal ($R_1$, $R_2$, $R_3$, . . . , $R_{15}$, $R_{16}$) and sends one bit of SR audio data at each of a number of the falling edges of the second clock signal ($SR_1$, $SR_2$, $SR_3$, . . . , $SR_{15}$, $SR_{16}$). After transmission of the R audio data and the SR audio data, the transmitter 300 sends one bit of C audio data at each of a number of the rising edges of the second clock signal ($C_9$, $C_{10}$, . . . , $C_{16}$) and sends one bit of W audio data at each of a number of the falling edges of the second clock signal by 1 bit ($W_9$, $W_{10}$, . . . , $W_{16}$).

Since the audio data consists of 16 bits per channel, a null interval carrying no data is generated after the transmissions of the R and SR audio data as well.

The receiver 400, which is synchronized with the transmitter 300, receives the 5.1 channel audio data. If the receiver 400 is an IC for receiving 2-channel audio data, the transmitter 300 sends the L audio data at the low level of the LRCLK and sends the R audio data at the high level of the first clock signal. At this time, the transmitter 300 sends the same audio data by 1-bit data at the rising edges and the falling edges of the second clock and the receiver 400 receives the 2-channel audio data by latching the 1-bit audio data at the rising edge.

As set forth above, the transmitter 300 can transmit the 5.1 channel audio data to the receiver 400. The transmitter 300 also can transmit the 2-channel audio data to the receiver 400 which receives the 2-channel audio data using the conventional I2S transmission scheme.

By transmitting and receiving the audio sample data at the falling edge of the bit clock and in the null interval, the I2S transmission scheme can be adopted to send the 5.1 channel audio data without additional I/O interfaces. It is possible to achieve compatibility with the existing audio data reception IC which receives the 2-channel audio data using the I2S transmission scheme.

The foregoing exemplary embodiments and aspects are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. An audio data transmission method comprising:

transmitting a first clock signal;

transmitting a second clock signal, the second clock signal having a frequency which is higher than a frequency of the first clock signal, while transmitting the first clock signal; and transmitting a plurality of bits of audio data over one period of the second clock signal, wherein the transmitting the plurality of bits of audio data comprises alternating a transmission of a plurality of 1-bit data segments of audio data of a first channel and a plurality of 1-bit data segments of audio data of a second channel on a bit-by-bit basis.

2. The audio data transmission method of claim 1, wherein the transmitting the plurality of bits of audio data comprises transmitting two bits of the audio data over one period of the second clock signal.

3. The audio data transmission method of claim 1, wherein the transmitting the plurality of bits of audio data comprises transmitting multiple channels of the audio data over a half period of the first clock signal.

4. The audio data transmission method of claim 1, wherein the transmitting the plurality of bits of audio data comprises:

when the first clock signal is low, transmitting a 1-bit data segment of audio data of the first channel at a rising edge of the second clock signal and transmitting a 1-bit data segment of audio data of the second channel at a falling edge of the second clock signal.

5. The audio data transmission method of claim 4, wherein the transmitting the plurality of bits of audio data further comprises:

when the first clock signal is high, transmitting a 1-bit data segment of audio data of a third channel at a rising edge of the second clock signal and transmitting a 1-bit data segment of audio data of a fourth channel at a falling edge of the second clock signal by 1 bit.

6. The audio data transmission method of claim 5, wherein the transmitting the plurality of bits of audio data further comprises:

after transmitting the audio data of the first channel and the audio data of the third channel, transmitting a 1-bit data segment of audio data of a fifth channel at a rising edge of the second clock signal and transmitting a 1-bit data segment of audio data of a sixth channel at a falling edge of the second clock signal.

7. The audio data transmission method of claim 1, wherein the transmitting the plurality of bits of audio data comprises transmitting a part of the plurality of bits of audio data of a first channel when the first clock signal is low and transmitting remaining bits of audio data of the first channel when the first clock signal is high.

8. The audio data transmission method of claim 1, wherein the audio data is 5.1 channel audio data.

9. The audio data transmission method of claim 1, wherein the frequency of the second clock signal is at most 64 times the frequency of the first clock signal.

10. An audio data reception method comprising:

receiving a first clock signal;

receiving a second clock signal, the second clock signal having a frequency which is higher than a frequency of the first clock signal, while receiving the first clock signal; and receiving a plurality of bits of audio data over one period of the second clock signal, wherein the receiving the plurality of bits of audio data comprises alternating the receiving of a plurality of 1-bit data segments of audio data of a first channel and a plurality of 1-bit data segments of audio data of a second channel on a bit-by-bit basis.

11. The audio data reception method of claim 10, wherein the receiving the plurality of bits of audio data comprises receiving two bits of the audio data over one period of the second clock signal.

12. The audio data reception method of claim 10, wherein the receiving the plurality of bits of audio data comprises receiving multiple channels of the audio data over a half period of the first clock signal.

13. The audio data reception method of claim 10, wherein the receiving the plurality of bits of audio data comprises:

when the first clock signal is low, receiving a 1-bit data segment of audio data of the first channel at a rising edge of the second clock signal and receiving a 1-bit data segment of audio data of the second channel at a falling edge of the second clock signal.

14. The audio data reception method of claim 13, wherein the receiving the plurality of bits of audio data further comprises:

when the first clock signal is high, receiving a 1-bit data segment of audio data of a third channel at a rising edge of the second clock signal and receiving a 1-bit data segment of audio data of a fourth channel at a falling edge of the second clock signal.

15. The audio data reception method of claim 14, wherein the receiving the plurality of bits of audio data further comprises:

after receiving the audio data of the first channel and the audio data of the third channel, receiving a 1-bit data segment of audio data of a fifth channel at a rising edge of the second clock signal and receiving a 1-bit data segment of audio data of a sixth channel at a falling edge of the second clock signal.

16. The audio data reception method of claim 10, wherein the receiving the plurality of bits of audio data comprises receiving a part of the plurality of bits of audio data of a first channel when the first clock signal is low and receiving remaining bits of audio data of the first channel when the first clock signal is high.

17. The audio data reception method of claim 10, wherein the audio data is 5.1 channel audio data.

18. The audio data reception method of claim 10, wherein the frequency of the second clock signal is at most 64 times the frequency of the first clock signal.

19. An electronic device comprising:

a transmitter which transmits a plurality of bits of audio data over one period of a second clock signal, the second clock signal having a frequency which is higher than a frequency of a first clock signal; and a receiver which is synchronized with the transmitter and which receives the plurality of bits of audio data from the transmitter, wherein the transmitter alternates a transmission of a plurality of 1-bit data segments of audio data of a first channel and a plurality of 1-bit data segments of audio data of a second channel on a bit-by-bit basis, and alternates a transmission of a plurality of 1-bit data segments of audio data of a third channel and a plurality of 1-bit data segments of audio data of a fourth channel on a bit-by-bit basis.

20. The electronic device of claim 19, wherein the transmitter sends two bits of the audio data over one period of the second clock signal.

21. The electronic device of claim 19, wherein the transmitter sends multiple channels of the audio data over a half period of the first clock signal.

22. The electronic device of claim 19, wherein the transmitter, when the first clock signal is low, sends a 1-bit data segment of audio data of the first channel at a rising edge of the second clock signal and sends a 1-bit data segment of audio data of the second channel at a falling edge of the second clock signal, and when the first clock signal is high, the transmitter sends a 1-bit data segment of audio data of the third channel at a rising edge of the second clock signal and sends a 1-bit data segment of audio data of the fourth channel at a falling edge of the second clock signal.

23. The electronic device of claim 19, wherein the transmitter sends a part of the plurality of bits of audio data of a first channel when the first clock signal is low and sends remaining bits of audio data of the first channel when the first clock signal is high.

24. The electronic device of claim 19, wherein the audio data is 5.1 channel audio data.

25. The electronic device of claim 19, wherein the frequency of the second clock signal is at most 64 times the frequency of the first clock signal.

26. An audio data transmission method comprising:

transmitting a first clock signal;

transmitting a second clock signal, the second clock signal having a frequency which is higher than a frequency of the first clock signal, while transmitting the first clock signal; and transmitting a plurality of bits of audio data over one period of the second clock signal, wherein the transmitting the plurality of bits of audio data comprises:

when the first clock signal is low, transmitting a 1-bit data segment of audio data of a first channel at a rising edge of the second clock signal and transmitting a 1-bit data segment of audio data of a second channel at a falling edge of the second clock signal, and when the first clock signal is high, transmitting a 1-bit data segment of audio data of a third channel at a rising edge of the second clock signal and transmitting a 1-bit data segment of audio data of a fourth channel at a falling edge of the second clock signal by 1 bit, and wherein the transmitting the plurality of bits of audio data comprises alternating the transmission of the plurality of 1-bit data segments of audio data of the third channel and the plurality of 1-bit data segments of audio data of the fourth channel on a bit-by-bit basis.

27. An audio data reception method comprising:

receiving a first clock signal;

receiving a second clock signal, the second clock signal having a frequency which is higher than a frequency of the first clock signal, while receiving the first clock signal; and receiving a plurality of bits of audio data over one period of the second clock signal, wherein the receiving the plurality of bits of audio data comprises:

when the first clock signal is low, receiving a 1-bit data segment of audio data of a first channel at a rising edge of the second clock signal and receiving a 1-bit data segment of audio data of a second channel at a falling edge of the second clock signal, and when the first clock signal is high, receiving a 1-bit data segment of audio data of a third channel at a rising edge of the second clock signal and receiving a 1-bit data segment of audio data of a fourth channel at a falling edge of the second clock signal, and wherein the receiving the plurality of bits of audio data comprises alternating the receiving of the plurality of 1-bit data segments of audio data of the third channel and the plurality of 1-bit data segments of audio data of the fourth channel on a bit-by-bit basis.

* * * * *